(12) United States Patent
Chen et al.

(10) Patent No.: US 11,885,045 B2
(45) Date of Patent: Jan. 30, 2024

(54) TEMPERATURE-SENSING AND HUMIDITY-CONTROLLING FIBER AND FABRICATING METHOD THEREOF

(71) Applicant: TAIWAN TEXTILE RESEARCH INSTITUTE, New Taipei (TW)

(72) Inventors: Wen-Jung Chen, New Taipei (TW); Wei-Hsiang Lin, New Taipei (TW); Chao-Huei Liu, New Taipei (TW)

(73) Assignee: TAIWAN TEXTILE RESEARCH INSTITUTE, New Taipei (TW)

( * ) Notice: Subject to any disclaimer, the term of this patent is extended or adjusted under 35 U.S.C. 154(b) by 0 days.

(21) Appl. No.: 17/690,118

(22) Filed: Mar. 9, 2022

(65) Prior Publication Data

US 2022/0333275 A1    Oct. 20, 2022

(30) Foreign Application Priority Data

Apr. 15, 2021  (TW) ................. 110113604

(51) Int. Cl.
*D01F 6/62* (2006.01)
*C08L 67/02* (2006.01)
*D01F 1/10* (2006.01)

(52) U.S. Cl.
CPC ............ *D01F 6/62* (2013.01); *C08L 67/02* (2013.01); *D01F 1/10* (2013.01); *C08L 2203/12* (2013.01); *C08L 2205/025* (2013.01); *C08L 2310/00* (2013.01); *D10B 2401/022* (2013.01); *D10B 2401/04* (2013.01)

(58) Field of Classification Search
CPC ................ C08L 67/02; C08L 2203/12; C08L 2205/025; D01F 1/10; D10B 2401/04; C08G 63/668; C08G 63/183; C08G 63/6856

See application file for complete search history.

(56) References Cited

U.S. PATENT DOCUMENTS

| 5,326,847 A | 7/1994 | Burleigh et al. |
| 2017/0276380 A1 | 9/2017 | Sakikawa et al. |
| 2021/0010165 A1 | 1/2021 | Chen et al. |
| 2021/0301124 A1 | 9/2021 | Yang et al. |

FOREIGN PATENT DOCUMENTS

| CN | 105040153 A | 11/2015 |
| CN | 105155012 A | 12/2015 |
| CN | 105859957 A | 8/2016 |
| CN | 105859997 A | 8/2016 |
| CN | 111321596 A | 6/2020 |
| CN | 112195530 A | 1/2021 |
| TW | M565705 U | 8/2018 |
| TW | I685597 B | 2/2020 |
| TW | 202102639 A | 1/2021 |
| WO | 2019086322 A1 | 5/2019 |

*Primary Examiner* — Marc S Zimmer
*Assistant Examiner* — Surbhi M Du
(74) *Attorney, Agent, or Firm* — McClure, Qualey & Rodack, LLP

(57) ABSTRACT

A temperature-sensing and humidity-controlling fiber includes a hydrophilic material and a temperature-sensing material. The temperature-sensing material has a lower critical solution temperature (LCST) between 31.2° C. and 32.5° C. when a light transmittance thereof is in a range from 3% to 80%, in which a wavelength of the light is between 450 nm and 550 nm.

6 Claims, 5 Drawing Sheets

TEMPERATURE-SENSING AND HUMIDITY-CONTROLLING FIBER AND FABRICATING METHOD THEREOF

RELATED APPLICATION

This application claims priority to Taiwan Application Serial Number 110113604, filed Apr. 15, 2021, which is herein incorporated by reference.

BACKGROUND

Field of Invention

The present disclosure relates to a textile fiber, and particularly relates to a temperature-sensing and humidity-controlling fiber and a fabricating method thereof.

Description of Related Art

In recent years, as people's demand for the quality of life has gradually increased, wearing comfort of clothing has become an important factor in the purchase of clothing. Functional clothing, of which the function can be adjusted in response to temperature changes in environment or body between autumn and winter, air-conditioned environment, and during exercise and sweating, has currently become an emerging product in the textile market.

Textiles applied in sportswear need to provide users with functions of quick-drying, cooling, and reducing heat loss when the external environmental condition changes, so as to maintain the thermal comfort. However, traditional moisture-absorbing and perspiration clothing is mainly manufactured by passive fabric structure design and finishing processing technology (e.g., single-sided or double-sided coating), resulting in the disadvantages of losing temperature and humidity-controlling functions due to sultriness under saturated humidity during exercise.

SUMMARY

The present disclosure provides a temperature-sensing and humidity-controlling fiber and a fabricating method thereof. Through the hydrophilic material and the temperature-sensing material in the temperature-sensing and humidity-controlling fiber, the temperature-sensing and humidity-controlling fiber can be provided with functions of quick-drying, cooling, and reducing heat loss, so as to stably maintain the thermal comfort of the clothing manufactured thereby.

According to some embodiments of the present disclosure, a temperature-sensing and humidity-controlling fiber includes a hydrophilic material and a temperature-sensing material. The temperature-sensing material has a lower critical solution temperature (LCST) between 31.2° C. and 32.5° C. when a transmittance of light of the temperature-sensing material is in a range from 3% to 80%, and a wavelength of the light is between 450 nm and 550 nm.

In some embodiments of the present disclosure, a weight ratio of the hydrophilic material and the temperature-sensing material is between 3:7 and 7:3.

In some embodiments of the present disclosure, when the hydrophilic material and the temperature-sensing material are uniformly mixed in a weight ratio of 3:7 to form a temperature-sensing and humidity-controlling material, the temperature-sensing and humidity-controlling material has a lower critical solution temperature between 31.2° C. and 33.5° C. when a transmittance of the light of the temperature-sensing and humidity-controlling material is in a range from 3% to 80%.

In some embodiments of the present disclosure, when the hydrophilic material and the temperature-sensing material are uniformly mixed in a weight ratio of 1:1 to form a temperature-sensing and humidity-controlling material, the temperature-sensing and humidity-controlling material has a lower critical solution temperature between 31.2° C. and 34.5° C. when a transmittance of the light of the temperature-sensing and humidity-controlling material is in a range from 3% to 80%.

In some embodiments of the present disclosure, when the hydrophilic material and the temperature-sensing material are uniformly mixed in a weight ratio of 7:3 to form a temperature-sensing and humidity-controlling material, the temperature-sensing and humidity-controlling material has a lower critical solution temperature between 31.2° C. and 36.0° C. when a transmittance of the light of the temperature-sensing and humidity-controlling material is in a range from 3% to 80%.

In some embodiments of the present disclosure, wherein based on a total weight of the temperature-sensing and humidity-controlling fiber, a total weight of the hydrophilic material and the temperature-sensing material is between 0.8 wt % and 1.2 wt %.

According to some embodiments of the present disclosure, a fabricating method of a temperature-sensing and humidity-controlling fiber includes the following steps. An intrinsic temperature-sensing and humidity-controlling masterbatch including a hydrophilic material, a temperature-sensing material, and a polyester material is provided, in which the temperature-sensing material has a lower critical solution temperature (LCST) between 31.2° C. and 32.5° C. when a transmittance of light of the temperature-sensing material is in a range from 3% to 80%, and a wavelength of the light is between 450 nm and 550 nm. A base material masterbatch including the polyester material is provided. The intrinsic temperature-sensing and humidity-controlling masterbatch and the base material masterbatch are uniformly mixed, such that the temperature-sensing and humidity-controlling fiber is formed.

In some embodiments of the present disclosure, the temperature-sensing material includes a structure represented by formula (1), in which in the formula (1), X includes a structure represented by formula (2) or formula (3):

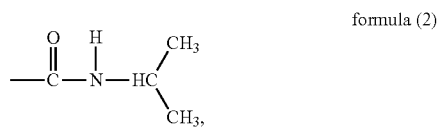

formula (2)

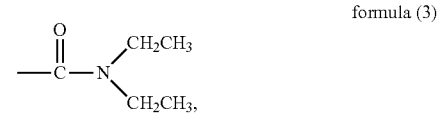

formula (3)

wherein a molar ratio of x and y is between 9:1 and 1:3, n is an integer between 7 and 120, and m is an integer between 10 and 1000.

In some embodiments of the present disclosure, the fabricating method of the temperature-sensing and humidity-controlling fiber further includes the following step. The temperature-sensing material is provided, in which a modifying step is performed on the hydrophilic material to form the temperature-sensing material.

In some embodiments of the present disclosure, the fabricating method of the temperature-sensing and humidity-controlling fiber further includes the following steps. The hydrophilic material, the temperature-sensing material, and the polyester material are uniformly mixed to form a mixture, and a powder refinement step, a powder dispersion step, and a kneading granulation step is performed on the mixture, such that the intrinsic temperature-sensing and humidity-controlling masterbatch is formed, in which a particle size of the temperature-sensing material after the powder refinement step and the powder dispersion step is between 1 μm and 500 μm.

In the aforementioned embodiments of the present disclosure, since the temperature-sensing and humidity-controlling fiber of the present disclosure includes the hydrophilic material and the temperature-sensing material, and the temperature-sensing material has a suitable lower critical solution temperature (LCST), the temperature-sensing and humidity-controlling fiber can be dried quickly at high temperatures to achieve the function of cooling, and can be dried in a slow manner at low temperatures to achieve the function of reducing heat loss, thereby maintaining body temperature. As such, clothing manufactured by the temperature-sensing and humidity-controlling fiber of the present disclosure can provide users with stable thermal comfort, and can be well applied to various moisture-absorbing and perspiration products.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
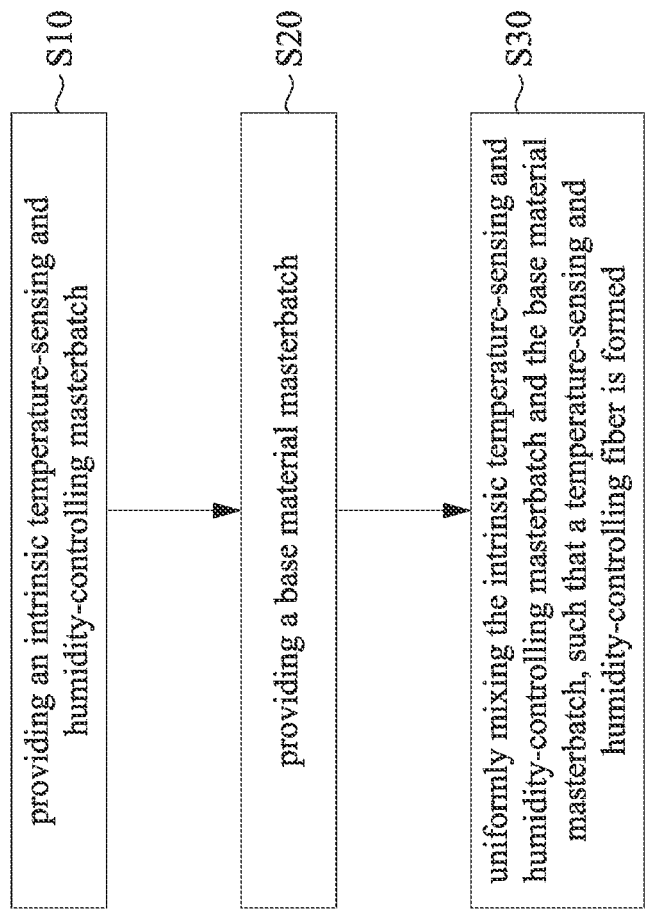
FIG. 1 is a flowchart illustrating a fabricating method of a temperature-sensing and humidity-controlling fiber according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

In the present disclosure, the structure of a polymer or a functional group is sometimes represented by a skeleton formula. This representation can omit carbon atoms, hydrogen atoms, and carbon-hydrogen bonds. Certainly, if the atom or atom group is clearly drawn in the structural formula, the drawing shall prevail.

The present disclosure provides a temperature-sensing and humidity-controlling fiber and a fabricating method thereof. Through the hydrophilic material and the temperature-sensing material in the temperature-sensing and humidity-controlling fiber, the temperature-sensing and humidity-controlling fiber can be dried quickly at high temperatures to achieve the function of cooling, and can be dried in a slow manner at low temperatures to achieve the function of reducing heat loss, thereby maintaining body temperature. Accordingly, clothing manufactured by the temperature-sensing and humidity-controlling fiber of the present disclosure can provide users with stable thermal comfort.

It should be understood that, for the sake of clarity and convenience of description, the fabricating method of the temperature-sensing and humidity-controlling fiber will be described firstly in the present disclosure, so as to specifically present the means for achieving the effect of the present disclosure. Reference is made to FIG. 1, which is a flowchart illustrating a fabricating method of a temperature-sensing and humidity-controlling fiber according to some embodiments of the present disclosure. The fabricating method of the temperature-sensing and humidity-controlling fiber includes steps S10, S20, and S30. In step S10, an intrinsic temperature-sensing and humidity-controlling masterbatch is provided. In step S20, a base material masterbatch is provided. In step S30, the intrinsic temperature-sensing and humidity-controlling masterbatch and the base material masterbatch are uniformly mixed, such that the temperature-sensing and humidity-controlling fiber is formed.

Figure 2:
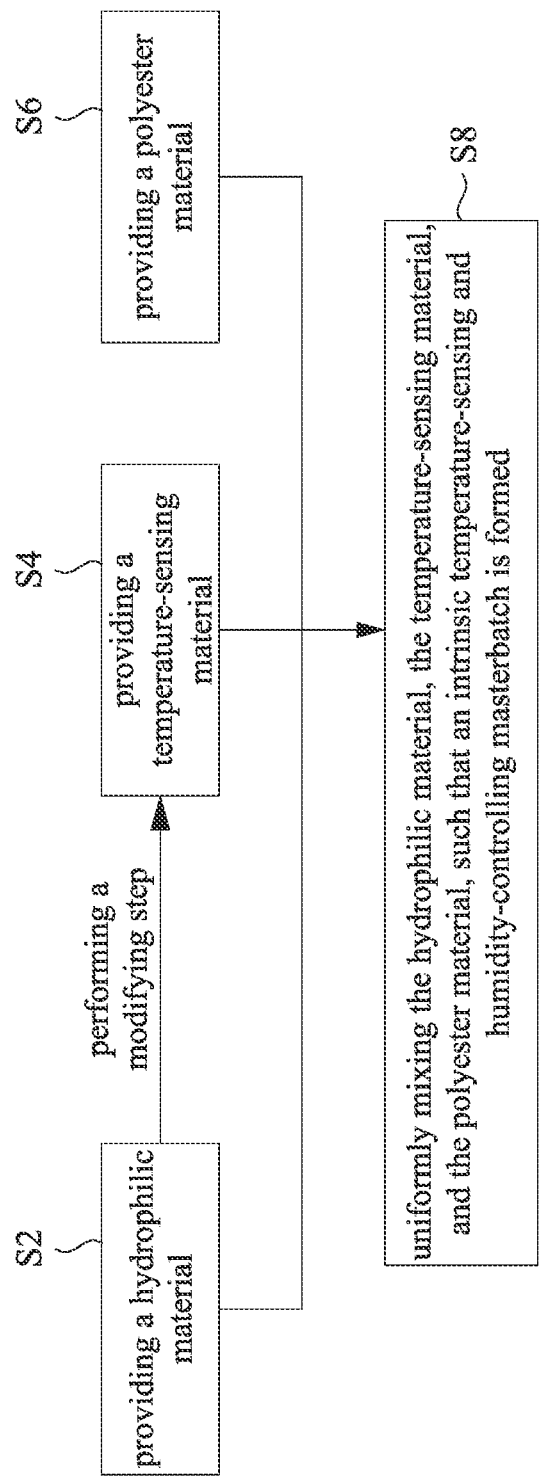
FIG. 2 is a flowchart illustrating a fabricating method of an intrinsic temperature-sensing and humidity-controlling masterbatch according to some embodiments of the present disclosure.

Before step S10, a hydrophilic material, a temperature-sensing material, and a polyester material may be provided to form the intrinsic temperature-sensing and humidity-controlling masterbatch, so as to provide the intrinsic temperature-sensing and humidity-controlling masterbatch in the subsequent step S10. In detail, reference is made to FIG. 2, which is a flowchart illustrating a fabricating method of an intrinsic temperature-sensing and humidity-controlling masterbatch according to some embodiments of the present disclosure. The fabricating method of the intrinsic temperature-sensing and humidity-controlling masterbatch may include steps S2, S4, S6, and S8. In step S2, a hydrophilic material is provided. In step S4, a temperature-sensing material is provided. In step S6, a polyester material is provided. In step S8, the hydrophilic material, the temperature-sensing material, and the polyester material are uniformly mixed to form the intrinsic temperature-sensing and humidity-controlling masterbatch.

Step S2: Providing a Hydrophilic Material

Figure 4:
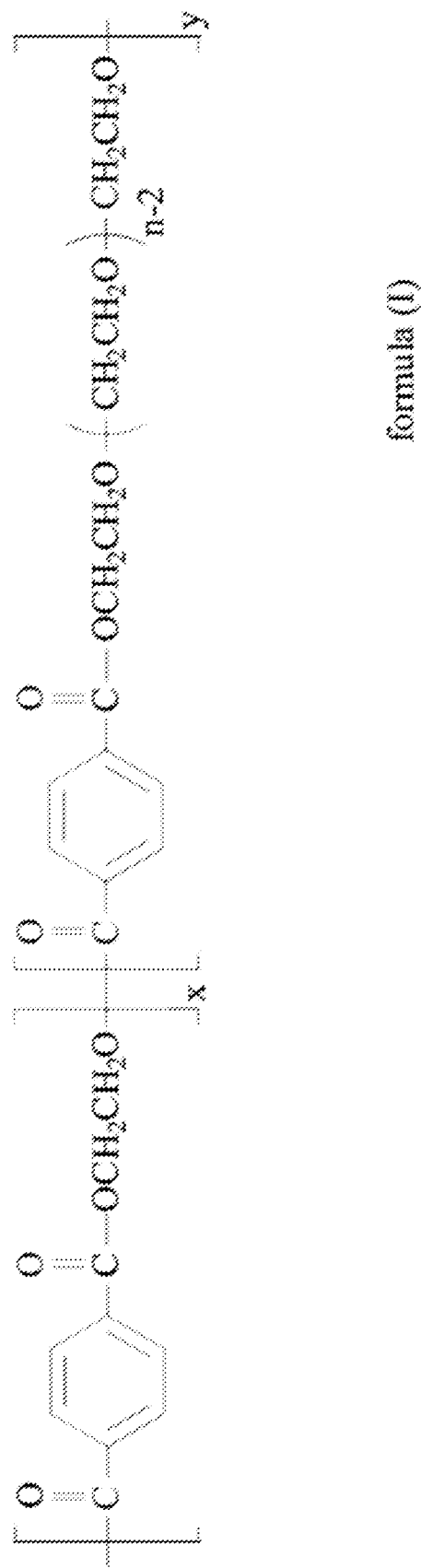
FIG. 4 is a chemical formula that shows "formula (I)" as this term is used throughout the present disclosure.

In some embodiments, the hydrophilic material may include a structure represented by formula (I) shown in FIG. 4, and in formula (I), a molar ratio of x and y is between 9:1 and 1:3, n is an integer between 7 and 120, and m is an integer between 10 and 1000. By adjusting the molar ratio of x and y and the values of m and n, the compatibility between the hydrophilic material and the polyester material can be greatly improved, such that the subsequently formed temperature-sensing and humidity-controlling fiber is provided with good and stable hydrophilicity, thereby strengthening the moisture conductivity of the temperature-sensing and humidity-controlling fiber, which is conducive to the regulation and evapotranspiration of moisture.

Step S4: Providing a Temperature-Sensing Material

The temperature-sensing material of the present disclosure has different light transmittance at different temperatures. In detail, when the temperature-sensing material is at a relatively low temperature (e.g., 31.0° C.), the temperature-sensing material has high light transmittance; and when the temperature-sensing material is at a relatively high temperature (e.g., 33.0° C.), the temperature-sensing material has low light transmittance. The above-mentioned characteristics of the temperature-sensing material can be specifically presented through the lower critical solution temperature (LCST). In detail, as the temperature rises, the temperature-sensing material gather with each other to cause the light transmittance to decrease, and when the light transmittance drops to 3%, the degree of aggregation of the temperature-sensing material hardly changes with the increase in temperature, and the temperature at this point is the maximum value of the lower critical solution temperature of the temperature-sensing material; relatively, as the temperature drops, the temperature-sensing material is dispersed to cause the light transmittance to increase, and when the light transmittance rises to equal to 80%, the degree of dispersion of the temperature-sensing material hardly changes with the decrease in temperature, and the temperature at this point is the minimum value of the lower critical solution temperature of the temperature-sensing material. Specifically, the temperature-sensing material of the present disclosure has a lower critical solution temperature between 31.2° C. and 32.5° C. when the light transmittance is 3% to 80%, in which the wavelength of light is between 450 nm and 550 nm. On the other hand, the temperature-sensing material of the present disclosure has different degrees of hydrophilicity at different temperatures. In detail, when the temperature-sensing material is at a relatively low temperature, the temperature-sensing material has strong hydrophilicity; and when the temperature-sensing material is at a relatively high temperature, the temperature-sensing material has weak hydrophilicity. Based on the above, since the temperature-sensing material of the present disclosure has a suitable lower critical solution temperature and has different degrees of hydrophilicity at different temperatures, the temperature-sensing and humidity-controlling fiber formed subsequently can be quickly dried at high temperatures to achieve the function of cooling, and can be dried in a slow manner at low temperatures to achieve the function of reducing heat loss.

It should be particularly noted that the method for measuring the lower critical solution temperature of the temperature-sensing material includes the following steps. First, 4 milliliters of the temperature-sensing material is placed into a sample bottle of 5 milliliters at room temperature. Next, the sample bottle is placed into an ultraviolet/visible light spectrophotometer (model: JASCO V630). Then, the initial temperature is set at 25° C. through the ultraviolet/visible light spectrophotometer, and the measurement is started. Next, the temperature is gradually increased to 36.5° C. with a heating rate of 1° C./min, and the light transmittance of the temperature-sensing material under each temperature is recorded. After the above steps, the lower critical solution temperature of the temperature-sensing material can be obtained.

In some embodiments, when the temperature-sensing material is mixed with the hydrophilic material to form a temperature-sensing and humidity-controlling material, the light transmittance of the temperature-sensing and humidity-controlling material may change with temperature. In detail, when the temperature-sensing and humidity-controlling material is at a relatively low temperature (e.g., 31.0° C.), the temperature-sensing and humidity-controlling material has high light transmittance; and when the temperature-sensing and humidity-controlling material is at a relatively high temperature (e.g., 37.0° C.), the temperature-sensing and humidity-controlling material has low light transmittance. The above-mentioned characteristics of the temperature-sensing and humidity-controlling material can be specifically presented through the lower critical solution temperature. For example, when the hydrophilic material and the temperature-sensing material are uniformly mixed in a weight ratio of 3:7 to form the temperature-sensing and humidity-controlling material, the temperature-sensing and humidity-controlling material has a lower critical solution temperature between 31.2° C. and 33.5° C. when the light transmittance of the temperature-sensing and humidity-controlling material is in a range from 3% to 80%. As another example, when the hydrophilic material and the temperature-sensing material are uniformly mixed in a weight ratio of 1:1 to form the temperature-sensing and humidity-controlling material, the temperature-sensing and humidity-controlling material has a lower critical solution temperature between 31.2° C. and 34.5° C. when the light transmittance of the temperature-sensing and humidity-controlling material is in a range from 3% to 80%. As a further example, when the hydrophilic material and the temperature-sensing material are uniformly mixed in a weight ratio of 7:3 to form the temperature-sensing and humidity-controlling material, the temperature-sensing and humidity-controlling material has a lower critical solution temperature between 31.2° C. and 36.0° C. when the light transmittance of the temperature-sensing and humidity-controlling material is in a range from 3% to 80%. In addition, when the temperature-sensing material is mixed with the hydrophilic material to form the temperature-sensing and humidity-controlling material, the hydrophilicity of the temperature-sensing and humidity-controlling material may change with temperature. In detail, when the temperature-sensing and humidity-controlling material is at a relatively low temperature, the temperature-sensing and humidity-controlling material has strong hydrophilicity; and when the temperature-sensing and humidity-controlling material is at a relatively high temperature, the temperature-sensing and humidity-controlling material has weak hydrophilicity. Based on the above, when the temperature-sensing material of the present disclosure and the hydrophilic material are uniformly mixed in an appropriate weight ratio, the lower critical solution temperature of the formed temperature-sensing and humidity-controlling material can be suitable and close to the lower critical solution temperature of the temperature-sensing material. That is, the addition of the hydrophilic material hardly affects the lower critical solution temperature of the temperature-sensing material, and the hydrophilic material can have different degrees of hydrophilicity at different temperatures. As such, the temperature-sensing and humidity-controlling fiber manufactured by the temperature-sensing material and the hydrophilic material can be provided with functions of quick-drying, cooling, and reducing heat loss, so as to stably maintain the thermal comfort of the clothing manufactured by the temperature-sensing and humidity-controlling fiber.

Figure 3:
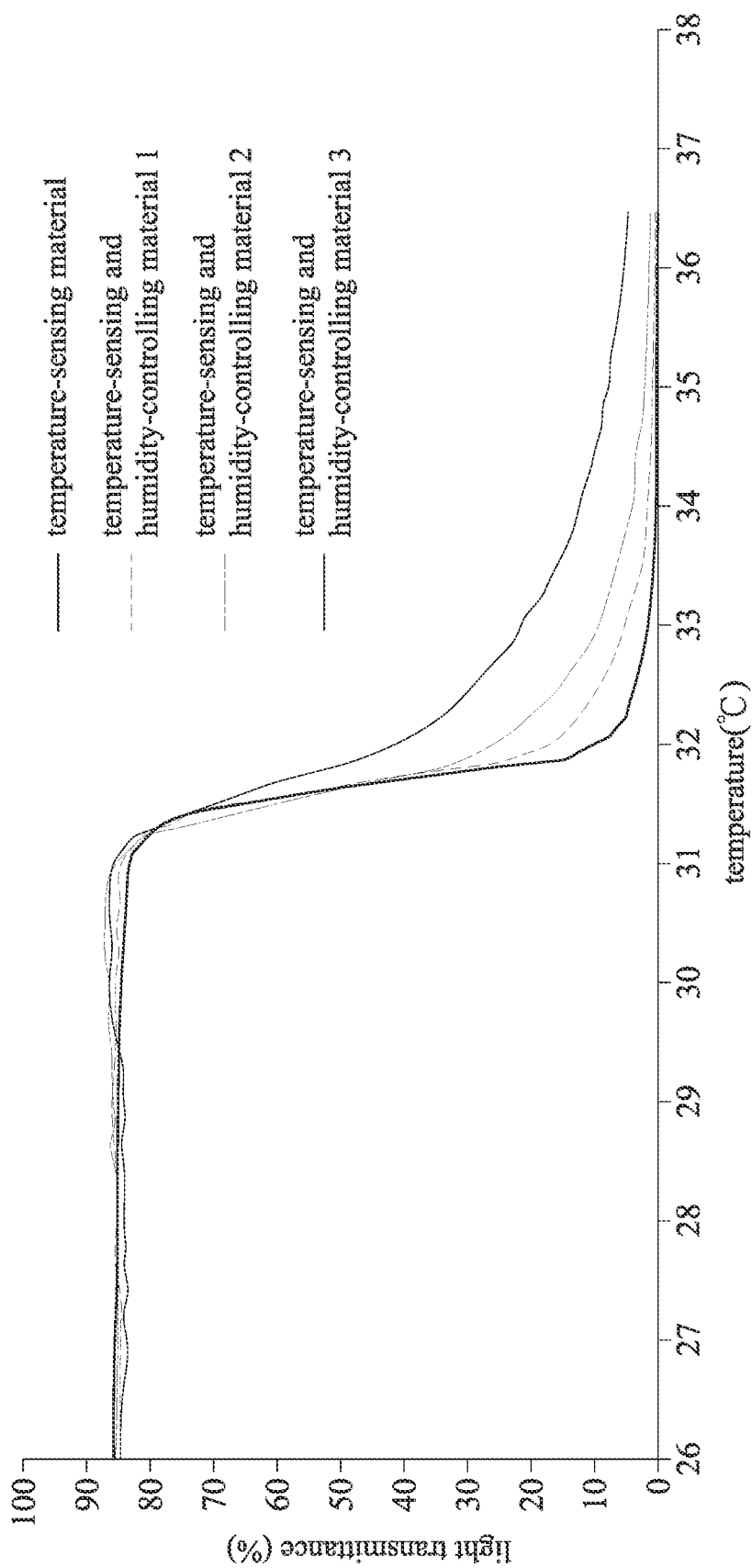
FIG. 3 is a graph illustrating relationships between the light transmittance and the temperature of a temperature-sensing material and a plurality of the temperature-sensing and humidity-controlling materials according to some embodiments of the present disclosure.

Reference is temporarily made to FIG. 3, which is a graph illustrating relationships between the light transmittance and the temperature of a temperature-sensing material and a plurality of the temperature-sensing and humidity-controlling materials according to some embodiments of the present disclosure. In detail, FIG. 3 specifically shows the relationship between the light transmittance and the temperature of the temperature-sensing material and the temperature-sensing and humidity-controlling materials 1 to 3, in which the weight ratio of the hydrophilic material and the temperature-sensing material in the temperature-sensing and humidity-controlling material 1 is 3:7, the weight ratio of the hydrophilic material and the temperature-sensing material in the temperature-sensing and humidity-controlling material 2 is 1:1, and the weight ratio of the hydrophilic material and the temperature-sensing material of the temperature-sensing and humidity-controlling material 3 is 7:3. It should be understood that the results shown in FIG. 3 are measured using the above-mentioned lower critical solution temperature measuring method, and the wavelength of the light used is 500 nm. From the results in FIG. 3, it can be seen that the lower critical solution temperatures of the temperature-sensing material and the temperature-sensing and the humidity-controlling materials 1 to 3 are all within the aforementioned suitable ranges, so as to stably maintain the thermal comfort of the clothing manufactured by the above temperature-sensing material and the temperature-sensing and humidity-controlling materials.

Figure 5:
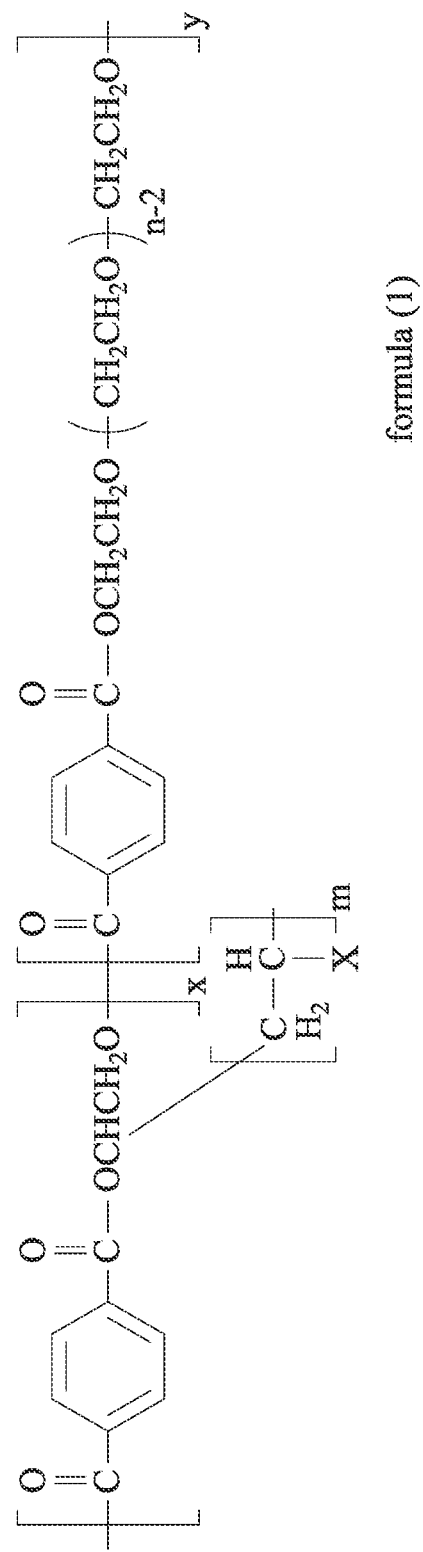
FIG. 5 is a chemical formula that shows "formula CI)" as this term is used throughout the present disclosure.

In some embodiments, the temperature-sensing material may include a structure represented by formula (1) shown in FIG. 5, in which in the formula (1), X includes a structure represented by formula (2) or formula (3):

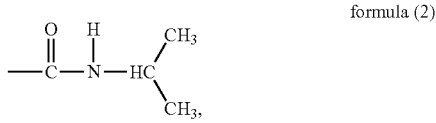

formula (2)

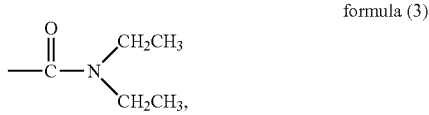

formula (3)

in which a molar ratio of x and y is between 9:1 and 1:3, n is an integer between 7 and 120, and m is an integer between 10 and 1000. In some embodiments, a weight average molecular weight of the temperature-sensing material may be between 10000 and 150000. By adjusting the molar ratio of x and y, the values of m and n, and the range of the weight average molecular weight, the compatibility between the temperature-sensing material and the polyester material can be greatly improved, such that the subsequently formed temperature-sensing and humidity-controlling fiber can effectively change its hydrophilicity with changes of external environment temperature or body temperature, thereby dynamically controlling the temperature and humidity.

In some embodiments, the temperature-sensing material can be obtained by modifying the hydrophilic material. For example, the fabricating method of the temperature-sensing material includes the following steps. Firstly, 200 grams of the hydrophilic material, 400 grams of a grafting material and 3500 milliliters of water are mixed to form a mixed solution. Subsequently, 500 milliliters of 1N nitric acid solution including 10 grams of cerium (IV) initiator is added to the mixed solution, and reacted at 55° C. for 5 hours. After the reaction is completed and cooled, the mixed solution is filtered and dried, so as to obtain a temperature-sensing material.

In some embodiments, the grafting material may include a structure represented by formula (4):

formula (4)

in which X may include a structure represented by formula (4-1) or formula (4-2):

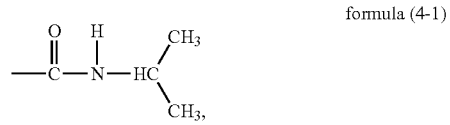

formula (4-1)

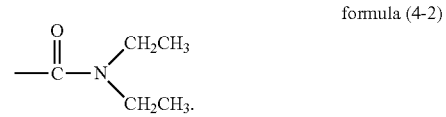

formula (4-2)

In some embodiments, the cerium (IV) initiator may include ceric ammonium nitrate, and may include a structure represented by formula (5):

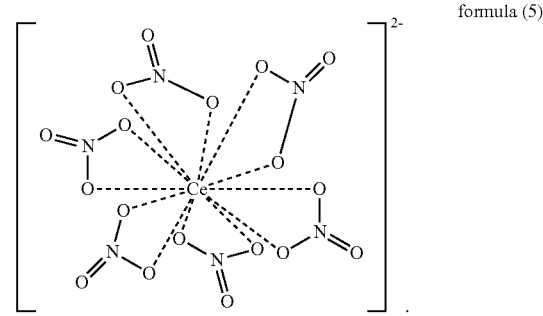

formula (5)

In some embodiments, the CAS Number of the cerium (IV) initiator may be 16774-21-3, and may be purchased from ACROS ORGANICS Ltd.

Step S6: Providing a Polyester Material

In some embodiments, the polyester material may include polyethylene terephthalate (PET), polybutylene terephthalate (PBT), or combinations thereof.

Step S8: Providing an Intrinsic Temperature-Sensing and Humidity-Controlling Masterbatch The hydrophilic material, the temperature-sensing material, and the polyester material are uniformly mixed to form a mixture, and a powder refinement step, a powder dispersion step, and a kneading granulation step are performed on the mixture, such that the intrinsic temperature-sensing and humidity-controlling masterbatch is formed. In some embodiments, a weight ratio of the hydrophilic material and the temperature-sensing material can be between 3:7 and 7:3, so as to provide the temperature-sensing and humidity-controlling fiber formed subsequently with good moisture conductivity and the ability to dynamically adjusting temperature and humidity. In detail, if the above-mentioned weight ratio is less than 3:7 (e.g., 2:8), the hydrophilicity of the temperature-sensing and humidity-controlling fiber is likely to be insufficient, thereby affecting the moisture conductivity and moisture evapotranspiration rate of the temperature-sensing and humidity-controlling fiber, and the excessively high proportion of the temperature-sensing material easily leads to complicated fabricating process (since the fabricating steps of the temperature-sensing material are more complicated than the fabricating steps of the hydrophilic material); and if the above-mentioned weight ratio is greater than 7:3 (e.g., 8:2), the ability of temperature and humidity adjustment of the temperature-sensing and humidity-controlling fiber is easily to be insufficient, thereby affecting the temperature-sensing and humidity-controlling properties of the fabric manufactured by the temperature-sensing and humidity-controlling fiber.

In some embodiments, the powder refinement step may include powder pulverizing at room temperature by a pulverizer. In some embodiments, the powder dispersion step may include powder dispersion at a rotation speed of about 500 rpm for about 5 minutes. In some embodiments, a particle size of the temperature-sensing material after the powder refinement step and the powder dispersion step may be between 1 μm and 500 μm, which facilitates the kneading granulation step. In some embodiments, the kneading temperature of the kneading granulation step may be between 220° C. and 270° C., and the screw speed may be between 150 rpm and 250 rpm. It is worth mentioning that the results of thermogravimetric analysis (TGA) of the hydrophilic material and the temperature-sensing material in the present disclosure show that thermal decomposition temperatures of the hydrophilic material and the temperature-sensing material are respectively about 362° C. and about 375° C. (analysis conditions: the temperature range is from 20° C. to 600° C., and the heating rate is 10° C./min), such that the hydrophilic material and the temperature-sensing material can stably exist in the environment of the above-mentioned kneading temperature without deterioration.

Please return to FIG. 1. After the intrinsic temperature-sensing and humidity-controlling masterbatch of the present disclosure is formed through the step S2 to steps S8, step S10 can be performed to provide the intrinsic temperature-sensing and humidity-controlling masterbatch. Subsequently, step S20 is performed to provide a base material masterbatch. In some embodiments, the base material masterbatch may include polyethylene terephthalate (PET), polybutylene terephthalate (PBT), or combinations thereof.

Next, step S30 is performed to uniformly mix the intrinsic temperature-sensing and humidity-controlling masterbatch and the base material masterbatch, such that the temperature-sensing and humidity-controlling fiber is obtained. In some embodiments, a melt-spinning step is performed on the intrinsic temperature-sensing and humidity-controlling masterbatch and the base material masterbatch, such that the temperature-sensing and humidity-controlling fiber is obtained. In some embodiments, the spinning temperature may be between 285° C. and 290° C., and the spinning speed may be between 2000 m/min and 3000 m/min. As mentioned above, since the hydrophilic material and the temperature-sensing material of the present disclosure have sufficiently high thermal decomposition temperatures, they can stably exist in the environment under the above-mentioned spinning temperature without deterioration. After step S30 is completed, the temperature-sensing and humidity-controlling fiber can be obtained. In some embodiments, based on a total weight of the temperature-sensing and humidity-controlling fiber, a total weight of the hydrophilic material and the temperature-sensing material may be between 0.8 wt % and 1.2 wt %, so as to provide the temperature-sensing and humidity-controlling fiber with good moisture conductivity, temperature and humidity adjustment, and fiber strength. In detail, if the above total weight is less than 0.8 wt %, the moisture conductivity and temperature and humidity adjustment of the temperature-sensing and humidity-controlling fiber are likely to be insufficient; and if the total weight is greater than 1.2 wt %, the fiber strength of the temperature-sensing and humidity-controlling fiber is easily to be insufficient, which is not conducive to subsequent applications. In some embodiments, a fiber specification of the temperature-sensing and humidity-controlling fiber may be between 75 d172f and 75 d136f.

It should be understood that the connection relationships and the functions of the components that have been described will not be repeated hereinafter. In the following description, multiple comparative examples and multiple embodiments will be listed for various tests and evaluations to further verify the efficacy of the present disclosure. The detailed description of each comparative example and each embodiment is shown in Table 1. It should be understood that the polyester materials used in each comparative example and each embodiment are all PET, and the fiber specifications of each comparative example and each embodiment are all 75 d/72f.

TABLE 1

| | total weight of hydrophilic material and temperature-sensing material (Based on total weight of temperature-sensing and humidity-controlling fiber) | weight ratio of hydrophilic material and temperature-sensing material |
|---|---|---|
| comparative example 1 | without adding hydrophilic material and temperature-sensing material | |
| comparative example 2 | 1.0 wt % | 1:0 |
| comparative example 3 | 1.0 wt % | 0:1 |
| comparative example 4 | 1.5 wt % | 0:1 |
| embodiment 1 | 1.0 wt % | 3:7 |
| embodiment 2 | 1.0 wt % | 5:5 |
| embodiment 3 | 1.0 wt % | 7:3 |

Experiment 1: Test for Fiber Strength on Fiber

In this experiment, the ASTM D2256 standard method is used to test the fiber strength of the fiber of each comparative example and the temperature-sensing and humidity-controlling fiber of each embodiment. The results are shown in Table 2.

TABLE 2

|  | fiber strength (g/d) |
| --- | --- |
| comparative example 1 | 4.62 |
| comparative example 2 | 3.13 |
| comparative example 3 | 2.85 |
| comparative example 4 | 2.47 |
| embodiment 1 | 3.06 |
| embodiment 2 | 2.62 |
| embodiment 3 | 2.98 |

As shown in Table 2, the temperature-sensing and humidity-controlling fiber of each embodiment can have a certain fiber strength, which is greater than 2.5 g/d, that meets the standard. On the other hand, the fiber strength of comparative example 4 is significantly low, which does not meet the standard.

Experiment 2: Test for Drying Time on Fabric

In this experiment, the fibers of comparative examples 1, 2, and 4 and the temperature-sensing and humidity-controlling fiber of each embodiment are used to manufacture fabrics, and the fine-tuned AATCC-199 standard method is used to test the drying time of the fabrics. In this experiment, the test conditions are: a temperature of 20° C., a humidity of 65%, a heating plate temperature of 35° C., and a water volume of 0.1 ml. The results are shown in Table 3.

TABLE 3

|  | drying time of fabrics |
| --- | --- |
| comparative example 1 | 23.13 seconds |
| comparative example 2 | 15.01 seconds |
| comparative example 4 | 12.41 seconds |

TABLE 3-continued

|  | drying time of fabrics |
| --- | --- |
| embodiment 1 | 13.07 seconds |
| embodiment 2 | 14.36 seconds |
| embodiment 3 | 12.57 seconds |

As shown in Table 3, compared with the fabrics manufactured by comparative examples 1 and 2, the fabric manufactured by each embodiment can have a shorter drying time, showing a better drying effect. It is worth noting that although the fabric manufactured by comparative example 4 has an outstanding performance on the drying time, it can be seen from the results of the aforementioned experiment 1 that the fiber of comparative example 4 has a lower fiber strength, which does not meet the standard and is not conducive to subsequent applications such as fabric weaving.

Experiment 3: Test for Moisture Evapotranspiration Difference Between High and Low Temperatures on Fabric In this experiment, the fiber of each comparative example and the temperature-sensing and humidity-controlling fiber of each embodiment are used to manufacture fabrics, and the moisture evapotranspiration of each fabric was tested under environments of different temperature and humidity. The moisture evapotranspiration differences between high and low temperatures are calculated. In this experiment, the test method of moisture evapotranspiration includes: recording the initial weight of the fabric, dripping water on the surface of the fabric, and recording the weight of the fabric at regular time intervals to calculate the moisture evapotranspiration. The test conditions are: a fabric area of 5×5 cm$^2$, and a water volume of 0.2 ml. The results are shown in Table 4.

TABLE 4

|  | moisture evapotranspiration in 15 minutes (%) | | | moisture evapotranspiration difference between high and low temperatures (B − A) | moisture evapotranspiration difference between high and low temperatures (C − A) |
| --- | --- | --- | --- | --- | --- |
|  | temperature: 20° C. humidity: 65% | temperature: 35° C. humidity: 65% | temperature: 35° C. humidity: 30% | | |
| comparative example 1 | 11.59 | 25.50 | 44.32 | 13.91 | 32.73 |
| comparative example 2 | 22.14 | 40.51 | 58.82 | 17.37 | 36.68 |
| comparative example 3 | 26.02 | 47.70 | 70.68 | 21.68 | 44.66 |
| comparative example 4 | 25.50 | 57.71 | 75.36 | 30.21 | 49.86 |
| embodiment 1 | 22.02 | 52.37 | 72.99 | 30.35 | 50.97 |
| embodiment 2 | 19.92 | 46.05 | 69.38 | 26.13 | 49.46 |
| embodiment 3 | 22.63 | 51.41 | 70.08 | 28.78 | 47.45 |

As shown in Table 4, compared with the fabrics manufactured by comparative examples 1 to 3, the fabric manufactured by each embodiment can have a larger moisture evapotranspiration difference between high and low temperatures, showing that the fabric manufactured by each embodiment can be dried quickly at high temperatures to achieve the function of cooling, and can be dried in a slow manner at low temperatures to achieve the function of reducing heat loss. It is worth noting that although the fabric manufactured by comparative example 4 is more prominent in the moisture evapotranspiration difference between high and low temperatures, and its moisture evapotranspiration difference between high and low temperatures is very close to the moisture evapotranspiration difference between high and low temperatures of the fabric manufactured by each embodiment, it can be seen from the results of the aforementioned experiment 1 that the fiber of comparative example 4 has a lower fiber strength, which does not meet the standard and is not conducive to subsequent applications.

Experiment 4: Test for Moisture Regain Percentage on Fabric

In this experiment, the fiber of comparative example 3 and the temperature-sensing and humidity-controlling fiber of each embodiment are used to manufacture fabrics, and the fabrics are placed in different environments to obtain fabric weights W1 and W2. The moisture regain percentage of each fabric is calculated accordingly to the fabric weights W1 and W2. In this experiment, W1 is the weight of the fabric measured under an absolute dry environment (105° C., RH 0%, lasting 2 hours), and W2 is the weight of the fabric measured under a high humidity environment (20° C., RH 65%, lasting 24 hours). The results are shown in Table 5.

TABLE 5

|  | moisture regain percentage (%) [(W2 − W1)/W1] |
| --- | --- |
| comparative example 3 | 0.76 |
| embodiment 1 | 0.87 |
| embodiment 2 | 0.93 |
| embodiment 3 | 1.00 |

As shown in Table 5, compared with the fabric manufactured by comparative example 3, the fabric manufactured by each embodiment has a larger moisture regain percentage, showing that the fabric manufactured by each embodiment is suitable for all kinds of products that require functions of moisture-absorbing and perspiration.

According to the aforementioned embodiments of the present disclosure, since the temperature-sensing and humidity-controlling fiber of the present disclosure includes the hydrophilic material and the temperature-sensing material, and the temperature-sensing material has a suitable lower critical solution temperature, the temperature-sensing and humidity-controlling fiber can be dried quickly at high temperatures to achieve the function of cooling, and can be dried in a slow manner at low temperatures to achieve the function of reducing heat loss, thereby maintaining body temperature. As such, clothing manufactured by the temperature-sensing and humidity-controlling fiber of the present disclosure can provide users with stable thermal comfort, and can be well applied to various moisture-absorbing and perspiration products.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A temperature-sensing and humidity-controlling fiber, comprising:
   a hydrophilic material; and
   a temperature-sensing material, wherein the temperature-sensing material has a lower critical solution temperature (LCST) between 31.2° C. and 32.5° C. when a transmittance of light of the temperature-sensing material is in a range from 3% to 80%, and a wavelength of the light is between 450 nm and 550 nm.

2. The temperature-sensing and humidity-controlling fiber of claim 1, wherein a weight ratio of the hydrophilic material and the temperature-sensing material is between 3:7 and 7:3.

3. The temperature-sensing and humidity-controlling fiber of claim 1, wherein when the hydrophilic material and the temperature-sensing material are uniformly mixed in a weight ratio of 3:7 to form a temperature-sensing and humidity-controlling material, the temperature-sensing and humidity-controlling material has a lower critical solution temperature between 31.2° C. and 33.5° C. when a transmittance of the light of the temperature-sensing and humidity-controlling material is in a range from 3% to 80%.

4. The temperature-sensing and humidity-controlling fiber of claim 1, wherein when the hydrophilic material and the temperature-sensing material are uniformly mixed in a weight ratio of 1:1 to form a temperature-sensing and humidity-controlling material, the temperature-sensing and humidity-controlling material has a lower critical solution temperature between 31.2° C. and 34.5° C. when a transmittance of the light of the temperature-sensing and humidity-controlling material is in a range from 3% to 80%.

5. The temperature-sensing and humidity-controlling fiber of claim 1, wherein when the hydrophilic material and the temperature-sensing material are uniformly mixed in a weight ratio of 7:3 to form a temperature-sensing and humidity-controlling material, the temperature-sensing and humidity-controlling material has a lower critical solution temperature between 31.2° C. and 36.0° C. when a transmittance of the light of the temperature-sensing and humidity-controlling material is in a range from 3% to 80%.

6. The temperature-sensing and humidity-controlling fiber of claim 1, wherein based on a total weight of the temperature-sensing and humidity-controlling fiber, a total weight of the hydrophilic material and the temperature-sensing material is between 0.8 wt % and 1.2 wt %.

* * * * *